May 22, 1934.  M. F. RICHARDSON  1,959,644
VALVE
Filed Nov. 9, 1932
FIG. I.
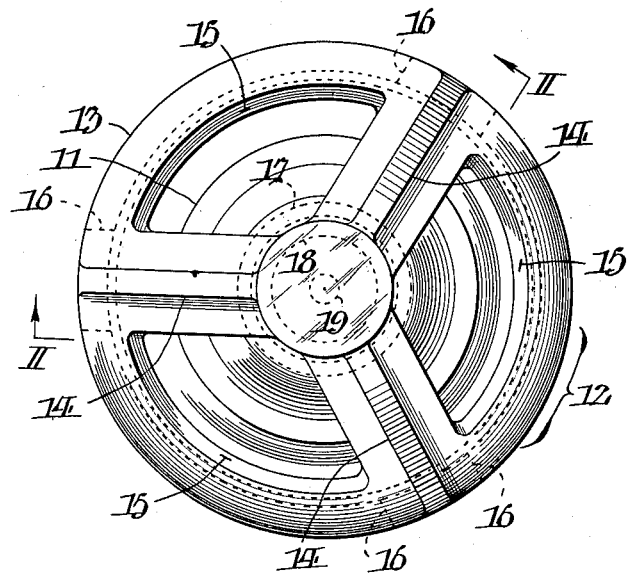
FIG. II.
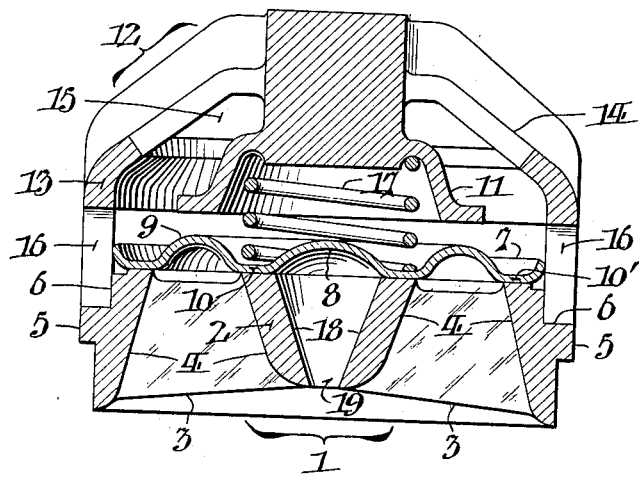
WITNESSES:
John A. Weidler
Woodrow Stevenson
INVENTOR:
Maurice F. Richardson,
BY
ATTORNEYS.

Patented May 22, 1934

1,959,644

UNITED STATES PATENT OFFICE 1,959,644

VALVE

Maurice F. Richardson, Berwyn, Pa.

Application November 9, 1932, Serial No. 641,817

3 Claims. (Cl. 251—144)

This invention relates generally to valves of the disc type, while it has more particular reference to valves for use in liquid or gas compressors and pumps capable of operating responsively to suction or pressure pulses in opening and closing the valve ports, such type of valve usually including a guard limiting the lift of the disc element and guide means preventing lateral displacement or "canting" of said element.

In valves of the type referred to, whether axially or peripherally guided, I have noted a tendency to what is known in the art as "slow opening" due to overcoming the differential or pressure hold set up between the valve and seat contacting area relative to the non-contacting area.

The object of my present invention is to effectively overcome the above noted tendency in a simple and positive manner; and to this end I provide the valve seat with a suitably proportioned and contoured axial passage effective to entrain a sufficient volume of liquid or gas for cushioning to build up a balancing pressure which will equalize the differential pressure heretofore existent; or, in other words, I aim to and effectively balance the pressures acting on the valve and seat contacting and non-contacting surfaces, so that said valve is rendered positive in action, and instantaneously responsive to the pressure or suction pulses in opening and closing the valve ports no matter at what velocity the valve is operating.

In the drawing:

Fig. I is a top plan view of a valve unit embodying the instant improvement; and, Fig. II is a vertical section of the same, taken approximately on the plane indicated by the arrows II—II in Fig. I.

In the embodiment of my invention illustrated, the valve comprises a ported seat member 1 having a conventional central boss 2 and radial webs 3 defining the flow passages or ports 4, therethrough. This seat member 1 is conveniently, although not essentially, provided around its medial portion with a stop rim 5, serviceable to limit forced-fit seating thereof in the usual partition or pump chest deck—not shown; and above said rim I form a marginal shoulder 6, for a purpose later on explained.

The valve disc, comprehensively designated by the numeral 7, is imperforate and struck from sheet metal to provide a central concavo-convex dome portion 8 with an annular arched ridge 9 intermediate its inner and outer seating surfaces 10, 10', respectively.

To limit movement or "lift" of the valve disc 7 I make use of a guard member 11 which is conveniently, although not essentially, formed integral with a "crows-foot" hold-down device 12. This device 12 embodies an annular portion 13, an overshot spider 14 defining flow orifices 15, and depending legs 16 for tight-press or forced-fit engagement on the marginal shoulder 6, above referred to. A spring 17, in compression, is interposed between the guard member 11 and the valve disc 7, while it will be noted the peripheral edge of said disc is guided by the legs 16 incident to pulsatory movement.

All of the foregoing structure is more or less in accordance with prevailing practice and the instant improvement has reference to the provision in the seat boss 2 of a tapering or inverted frusto-conical, or other appropriately contoured and dimensioned, axial passage 18; which it will be remarked has the larger and upper diameter substantially approximating that of the base of the valve disc dome portion 8, see Fig. II. Now it will be readily understood that, as the valve disc 7 pulsates, a volume of liquid or gas will be drawn into the passage 18 on the suction pulsation by way of the narrower or bottom end 19 thereof, and also that on the pressure pulsation, said volume of gas will be relatively compressed in said passage and built up to a higher degree than that of the suction pressure. This higher degree of pressure will obviously, and incident to its axial direction against the dome portion 8, serve to counteract or balance the pressure-hold of the valve contacting areas 10, 10'. In other words, by proper proportioning and shaping of the passage 18, I am enabled to effectively remove the pressure differential normally existing as between the contacting and noncontacting valve and seat areas in the typified form of valve, to the complete avoidance of any tendency to "slow opening".

From the foregoing it will be apparent that the inventive idea herein set forth may be varied in adapting the same to different forms of pulsatory valves, hence my invention is not to be construed as limited to the specific form illustrated and described, inasmuch as minor structural changes can be resorted to without departure from the scope of the following claims.

Having thus described my invention, I claim:

1. In a valve the combination of a ported seat member with a central boss, a discous valve element embodying a central concavo-convex dome portion and an annular arched ridge, a stationary overhang and hold-down component having legs to engage the seat member outer surface under forced fit, said component affording peripheral guidance for the valve element while securing all the parts in complete assembly, and the central boss aforesaid having an axial inverted frusto-conical passage effective on the suction pulse to entrain a volume of liquid or gas for cushioning on the pressure pulse, to a degree balancing the normal differential pressure existing between the contacting and non-contacting valve and seat areas.

2. In a valve comprising a ported seat member with a central boss, an imperforate valve element embodying a central domed-portion, means jointly affording guidance for and limiting movement of the valve element, and the central boss aforesaid having a tapering axial passage effective in conjunction with the valve domed-portion to entrain liquid or gas for cushioning to a degree balancing the normal differential pressure between the contacting and non-contacting valve and seat areas.

3. In a valve comprising a ported seat member with a central boss, an imperforate discous valve element embodying a central concavo-convex portion, means affording guidance for and limiting movement of said valve element, and the central boss aforesaid having a frusto-conical passage therethrough with its wider end toward the valve element concavo-convex portion, said passage and concavo-convex portions jointly serving on the suction pulse to entrain a volume of liquid or gas for cushioning on the pressure pulse to a degree balancing the normal differential pressure between the contacting and non-contacting valve and seat areas.

MAURICE F. RICHARDSON.